Patented Dec. 13, 1927.

1,652,725

UNITED STATES PATENT OFFICE.

CHARLES H. MILLIGAN, OF WYOMING, OHIO.

PROCESS FOR THE RECOVERY OF SODIUM COMPOUNDS FROM WASTE SULPHITE LIQUORS.

No Drawing. Application filed October 30, 1926. Serial No. 145,371.

This invention relates to a process for the recovery of sodium compounds from the spent liquors resulting from the digestion of wood or other cellulosic material with an acid cooking liquor containing sodium compounds, and to the conversion of the said sodium compounds into sulphite liquors suitable for reuse in the cooking process.

It is common practice in the wood pulp industry to cook wood with an acid sulphite cooking liquor comprising either a soda, lime, magnesia or lime-magnesia base. It is recognized that an acid sulphite cooking liquor having a soda base produces a pulp having certain superior qualities over pulp made with a lime or magnesia base; such as, for example, greater strength and the ability to be bleached easily. However, the relatively greater cost of sodium sulphite necessitates a recovery process for the economical operation using a sodium sulphite liquor.

Several methods for the recovery of sodium salts from spent sodium sulphite liquors have been proposed. Thus, it has been proposed that the spent sulphite liquors may be neutralized with an alkali, concentrated, and smelted in a reducing atmosphere, forming thereby sodium sulphide and sodium carbonate. The latter compounds may be leached from the smelt with water, and treated with sulphur dioxide for the production of sodium sulphite. This method is disadvantageous, since the treatment of the solution of sodium sulphide and sodium carbonate with sulphur dioxide may produce sodium thiosulphate, which compound is undesirable in the finished sodium sulphite cooking liquor. United States Patent No. 1,545,522, to G. A. Richter, discloses a method for the recovery of sodium compounds from a smelt obtained as above described, comprising the steps of treating the solution containing sodium sulphide and sodium carbonate with carbon dioxide, thus displacing hydrogen sulphide, and subjecting the sodium carbonate thus formed to treatment with sulphur dioxide. While this disclosed method avoids the difficulties due to the formation of sodium thiosulphate, it has the serious objection that the hydrogen sulphide displaced by the carbon dioxide treatment is more or less contaminated with carbon dioxide, thereby making difficult its recovery.

The object of the present invention is to provide a method of recovering sodium salts from spent sulphite cooking liquors which is economical in operation and free from the difficulties involved in the sodium recovery processes heretofore disclosed.

The present invention is based upon my discovery of the fact that, by treating an alkali metal sulphide, in the presence of water, with certain organic acids, there is obtained the alkali metal salt of the organic acid which is decomposable by treatment with sulphur dioxide to the formation of alkali metal sulphite and the free organic acid.

I have found that sodium sulphite adaptable for use directly in the preparation of an acid cooking liquor may be obtained in an economical manner by treating a solution containing sodium sulphide with an organic acid which is capable of displacing hydrogen sulphide and which is replaceable by sulphur dioxide, thereby forming a sodium salt of the organic acid, expelling hydrogen sulphide from the said salt of the organic acid, and treating the hydrogen sulphide free sodium salt with sulphur dioxide, thereby producing free organic acid and sodium sulphite. The hydrogen sulphide displaced by the treatment of the sodium sulphide solution with the organic acid may be burned to form sulphur dioxide, which may be used in a subsequent step of the process. The organic acid liberated from the sodium salt by treatment of the latter with sulphur dioxide is separated from the solution of sodium sulphite and may be reused for treating a further quantity of sulphide solution. The process is a cyclic one in which substantially all of the sodium, sulphur and organic acid may be recovered and reused.

A large number of organic acids have been found to be suitable for this process; for example, abietic acid, oleic acid, stearic acid, palmitic acid, and the like. Also, I have found that mixtures of two or more organic acids may be used in this process with results equaling those obtained by the use of an individual organic acid. It is essential that the acid employed be stronger than hydrogen sulphide, that is, it must be capable of displacing hydrogen sulphide from sodium sulphide, and it must be weaker than sulphur dioxide, that is, sulphur dioxide must be capable of liberating the free organic acid from the sodium salt thereof.

Also it is essential that the organic acid shall not react with either hydrogen sulphide or sulphur dioxide. It is preferable that the organic acid be relatively insoluble in an aqueous solution of sodium sulphite, since the said acid may then be separated easily from the sulphite solution by settling, decanting or filtering. Acids which form soaps have been found satisfactory in this process.

The spent sodium sulphite liquors as separated from digested cellulosic material contain some free sulphurous acid ($H_2SO_3$) which rapidly would attack ordinary equipment. For this reason the spent liquors may be neutralized, for example, by the addition of sufficient soda ash to combine with the free acid. The substantially neutral solution thus obtained is concentrated, either in open pans or, preferably, in multiple effect evaporators. As these liquors contain large amounts of combustible organic matter, the concentration may be carried to the point at which the heat from the burning of the organic material will be capable of driving off the residual moisture in the concentrated material. The properly concentrated material is then fed into a smelting furnace where the organic matter is burned and the sodium compounds are smelted in a reducing atmosphere forming chiefly a mixture of sodium carbonate and sodium sulphide, which is then dissolved in water, as is done in standard practice.

The solution containing sodium sulphide, with or without sodium carbonate obtained according to the above described operations, is treated with a sufficient amount of the organic acid to liberate hydrogen sulphide, leaving any carbonate practically unaffected. The acid may be added to a cold, or hot, solution of the sodium compounds. The hydrogen sulphide so produced is separated from the reaction mixture by any suitable means. For example, the reaction mixture may be boiled for a period of time sufficient to remove the hydrogen sulphide.

The reaction mixture, containing the sodium salts of the organic acid or acids, is then treated with sulphur dioxide, thereby liberating free organic acid and producing an aqueous solution comprising sodium sulphite, with or without some sodium bisulphite. The free organic acid is separated from the aqueous solution of the said sodium compounds, as for example, by settling and decanting, and may be reused directly with a subsequent batch of recovered sodium sulphide and sodium carbonate. The aqueous solution of sodium sulphite is treated with sulphur dioxide, after dilution to the proper strength for a cooking liquor, and used for the treatment of additional cellulosic material.

In the treatment of the solution containing sodium sulphide and sodium carbonate with organic acid, it is preferable to use only a little more than enough acid to liberate the hydrogen sulphide, leaving any sodium carbonate which may be present practically untouched. Since hydrogen sulphide is a weaker acid than carbonic acid, the sodium sulphide will react with the organic acid more readily than will the sodium carbonate.

The following is an example illustrating the present invention:

An aqueous solution containing about 100 lbs. of sodium as sodium sulphide, in about 2000 lbs. of water, is treated with about 1100 lbs. of cotton seed oil fatty acids, thereby producing a solution of a sodium salt (soap) of the cotton seed oil fatty acids. The hydrogen sulphide displaced in this reaction is separated from the salt (soap) solution by boiling. This operation advantageously may be carried out in a kettle similar to those ordinarily used in the preparation of soap. The soap solution produced by the above reaction subsequently is contacted with sulphur dioxide, thereby producing a mixture of free fatty acid and an aqueous solution of sodium sulphite. The mixture, upon being allowed to stand, separates into two layers; the upper layer comprising the free fatty acid and the lower layer comprising the aqueous solution of sodium sulphite. The supernatant fatty acid layer may be removed substantially completely by decantation. The sodium sulphite solution thus obtained is contacted with sulphur dioxide, producing an acid sodium sulphite cooking liquor adaptable, upon dilution, for use directly in the digestion of cellulosic material.

It is to be understood that my process is applicable to the production of an alkali metal sulphite from an alkali-metal sulphide obtained in any other manner than that above described. Thus, I may use as starting material ordinary commercial alkali metal sulphide.

I claim:

1. Process for the production of an alkali metal sulphite which comprises treating an aqueous solution of an alkali metal sulphide with an organic acid which is capable of displacing hydrogen sulphide and which is replaceable by sulphur dioxide, and contacting the resulting reaction mixture with sulphur dioxide.

2. Process for the production of sodium sulphite which comprises treating an aqueous solution of sodium sulphide with an organic acid which is capable of displacing hydrogen sulphide and which is replaceable by sulphur dioxide, and contacting the resulting reaction mixture with sulphur dioxide.

3. Process for the production of an alkali metal sulphite which comprises treating an aqueous solution of an alkali metal sulphide with an organic acid which is capable of displacing hydrogen sulphide and which is replaceable by sulphur dioxide and which is relatively insoluble in an aqueous solution of the alkali metal sulphite, and contacting the resulting reaction mixture with sulphur dioxide.

4. Process for the production of sodium sulphite which comprises treating an aqueous solution of sodium sulphide with an organic acid which is capable of displacing hydrogen sulphide and which is replaceable by sulphur dioxide and which is relatively insoluble in an aqueous solution of sodium sulphite, and contacting the resulting reaction mixture with sulphur dioxide.

5. Process for the production of sodium sulphite which comprises treating an aqueous solution of sodium sulphide with soap forming acids, separating hydrogen sulphide from the resulting reaction mixture, and contacting the hydrogen sulphide-free reaction mixture with sulphur dioxide.

6. Process for the production of an aqueous solution of sodium sulphite from spent acid cooking liquors containing sodium compounds of sulphur; which comprises neutralizing and concentrating the spent acid liquors, smelting in a reducing atmosphere and recovering in an aqueous solution the sodium compounds thereof, treating the aqueous solution of the sodium compounds with an organic acid which is capable of replacing hydrogen sulphide and which is replaceable by sulphur dioxide, and contacting the resulting reaction mixture with sulphur dioxide for the production of free organic acid and an aqueous solution of sodium sulphite.

7. Process which comprises digesting raw cellulosic material in an acid sodium compound cooking liquor, separating, neutralizing and concentrating the spent acid liquor, smelting in a reducing atmosphere and recovering in an aqueous solution the sodium compounds thereof, treating the aqueous solution of the sodium compounds with an organic acid which is capable of replacing hydrogen sulphide and which is replaceable by sulphur dioxide, separating the hydrogen sulphide so produced from the resulting reaction mixture, contacting the hydrogen sulphide-free reaction mixture with sulphur dioxide for the production of free organic acid and an aqueous solution containing sodium sulphite, separating the free organic acid from said aqueous solution, and acidifying said aqueous solution with sulphur dioxide to produce an acid sodium compound cooking liquor for use in the repetition of the first mentioned step.

8. Process for the production of an aqueous solution of sodium sulphite from spent acid cooking liquors containing sodium compounds, which comprises neutralizing and concentrating the spent acid liquors, smelting in a reducing atmosphere and recovering in an aqueous solution the sodium compounds thereof, treating the aqueous solution of the sodium compounds with soap forming acids, separating the hydrogen sulphide so produced from the reaction mixture, contacting the hydrogen sulphide-free reaction mixture with sulphur dioxide for the production of free soap forming acids and an aqueous solution of sodium sulphite, and separating the free acids from the solution of sodium sulphite.

In testimony whereof, I affix my signature.

CHARLES H. MILLIGAN.